(12) United States Patent
Rao

(10) Patent No.: US 10,055,234 B1
(45) Date of Patent: Aug. 21, 2018

(54) SWITCHING CPU EXECUTION PATH DURING FIRMWARE EXECUTION USING A SYSTEM MANAGEMENT MODE

(71) Applicant: American Megatrends, Inc., Norcross, GA (US)

(72) Inventor: Srinivasan Narayana Rao, Suwanee, GA (US)

(73) Assignee: American Megatrends, Inc., Norcross, GA (US)

( * ) Notice: Subject to any disclaimer, the term of this patent is extended or adjusted under 35 U.S.C. 154(b) by 141 days.

(21) Appl. No.: 15/176,895

(22) Filed: Jun. 8, 2016

(51) Int. Cl.
*G06F 9/4401* (2018.01)

(52) U.S. Cl.
CPC .............. *G06F 9/441* (2013.01); *G06F 9/442* (2013.01); *G06F 9/4405* (2013.01); *G06F 9/4418* (2013.01)

(58) Field of Classification Search
None
See application file for complete search history.

(56) References Cited

U.S. PATENT DOCUMENTS

| 6,453,278 B1* | 9/2002 | Favor | G06F 7/74 703/26 |
| 2004/0123007 A1* | 6/2004 | Stevens, Jr. | G06F 13/378 710/260 |
| 2008/0082816 A1* | 4/2008 | Lam | G06F 9/45533 713/2 |

* cited by examiner

*Primary Examiner* — Paul J Yen
(74) *Attorney, Agent, or Firm* — Newport IP, LLC Shigeta | Hope

(57) ABSTRACT

A computer system firmware is provided that includes functionality for using a system management mode (SMM) to efficiently boot to a secondary operating system prior to booting to a primary operating system. The SMM is utilized to store data describing the state of the computer system at a point just prior to booting the secondary operating system. This data is used following execution of the secondary operating system to restore the system to the same state that it was in prior to executing the secondary operating system. Execution can then be continued at a location just following the location at which the secondary operating system was booted in order to execute a primary operating system.

20 Claims, 5 Drawing Sheets

SWITCHING CPU EXECUTION PATH DURING FIRMWARE EXECUTION USING A SYSTEM MANAGEMENT MODE

BACKGROUND

In some computing systems, low level instruction code is used as an intermediary between the hardware components of the computing system, the operating software, and other high level software executing on the computing system. In some computer systems, this low level instruction code is known as the computer Basic Input and Output System ("BIOS"). The BIOS provides a set of software routines that allows high level software to interact with the hardware components of the computing system using standard calls.

Because of limitations of the BIOS in many PC-compatible computers, a specification for creating the firmware that is responsible for booting the computer and for intermediating the communication between the operating system and the hardware has been proposed. The specification is called the Extensible Firmware Interface ("EFI") specification and is available from INTEL CORPORATION. The original EFI Specification from INTEL CORPORATION has also been extended by the Unified Extensible Firmware Interface ("UEFI") Forum. Additional details regarding the EFI and UEFI firmware architectures are defined by the group of specifications called INTEL Platform Innovation Framework for EFI ("the Framework"), which is available from INTEL CORPORATION.

The EFI specification describes an interface between the operating system and the system firmware. In particular, the EFI specification defines the interface that platform firmware implements, and the interface that the operating system can use in booting. How the firmware implements the interface is left up to the manufacturer of the firmware. The EFI specification provides protocols for EFI drivers to communicate with each other, and the core provider functions such as allocation of memory, creating events, setting the clock, and the like. This is accomplished through a formal and complete abstract specification of the software-visible interface presented to the operating system by the platform and the firmware.

Both BIOS and EFI utilize the system management mode ("SMM") provided in microprocessors available from INTEL CORPORATION and AMD CORPORATION. SMM is a special-purpose operating mode for handling system-wide functions like power management, system hardware control, or proprietary original equipment manufacturer ("OEM")-designed code. A benefit of SMM is that SMM can offer a distinct and isolated processor environment that operates transparently to the operating system or executive and software applications.

When SMM is invoked through a system management interrupt ("SMI"), the central processing unit saves the current state of the processor (the processor's context), then switches to a separate operating environment contained in a special portion of random access memory ("RAM") called the system management RAM ("SMRAM"). While in SMM, the microprocessor executes SMI handler code to perform operations such as powering down unused disk drives or monitors, executing proprietary code, or placing the entire computer in a suspended state. When the SMI handler has completed its operations, the SMI handler executes a resume ("RSM") instruction. This instruction causes the microprocessor to reload the saved context of the processor, switch back to protected or real mode, and resume executing the interrupted application or operating-system program or task. Operating systems ("O/S") and applications executing at the O/S level utilize software SMIs to invoke firmware services. For example, the O/S and applications can utilize software SMIs to invoke services provided by the BIOS or other type of computer system firmware.

In some examples, it may be desirable for certain functions to occur prior to handing over a system to a primary O/S after firmware initialization. In conventional systems, to provide for that functionality, the initialization of the primary O/S may be interrupted, whereby the initialization for a secondary O/S commences. Once the secondary O/S is shut down, the initialization procedure of the primary O/S is restarted.

It is with respect to these and other considerations that the various configurations described below are presented.

SUMMARY

Technologies are disclosed herein for using a SMM to initialize and execute a secondary O/S. In some examples, upon receiving power, a computer system firmware commences system initialization prior to executing the primary operating system loader. In some examples, this initialization includes routines for identifying and initializing various hardware devices, as well as for performing a power-on-self-test ("POST"). In some examples, the BIOS initialization includes a flag. The flag is a bit of data in memory that indicates to the firmware that a secondary O/S is to be booted rather than the primary operating system.

If the flag is set, an SMI is generated in order to cause the computer system to enter SMM. Upon entry into the SMM, a save handler is executed. The save handler causes the system to store data describing various aspects of the current state of the system into a memory ("save state"). The memory used can vary depending on the application, but in some examples, the memory can be a system management RAM ("SMRAM"). In some examples, a copy of the save state is stored in another memory location, such as another RAM. In some examples, the storing of the copy can reduce the probability of the save state being overwritten during execution of the secondary O/S. The save state includes the processor context at the time of the SMI. In some examples, the save state can also include, but is not limited to, chipset registers, interrupt controllers, and a return address at which execution is to resume following the execution of the secondary O/S.

After the save state has been stored, the system exits the SMM and boots to the secondary O/S. For example, the secondary O/S can be a LINUX or WINDOWS operating system. Once the secondary O/S is booted, the system executes an application. In some examples, the application can provide functionality not provided by a BIOS, or functionality that is desired to be performed prior to booting to the primary operating system. After execution of the application has completed, the secondary O/S is shut down.

Responsive to the secondary O/S being shut down, another SMI is generated, the SMM is entered, and a restore handler is executed. The restore handler causes the retrieval of the save state from its location in memory and restoration of the chipset registers, interrupt controllers, and processor context stored therein to their original locations. In some examples, execution of the computer system firmware commences at a location just following the SMI instruction that initiated the SMM for executing the save handler. In some examples, additional SMI instructions may be part of the system initialization. In various examples, the system initialization continues to an operating system loader to continue booting to the primary operating systems.

The subject matter described herein can also be implemented in a computing system, as an apparatus, or as an article of manufacture such as a computer-readable storage medium. These and various other features as well as advantages will be apparent from a reading of the following detailed description and a review of the associated drawings.

DETAILED DESCRIPTION

Figure 1:
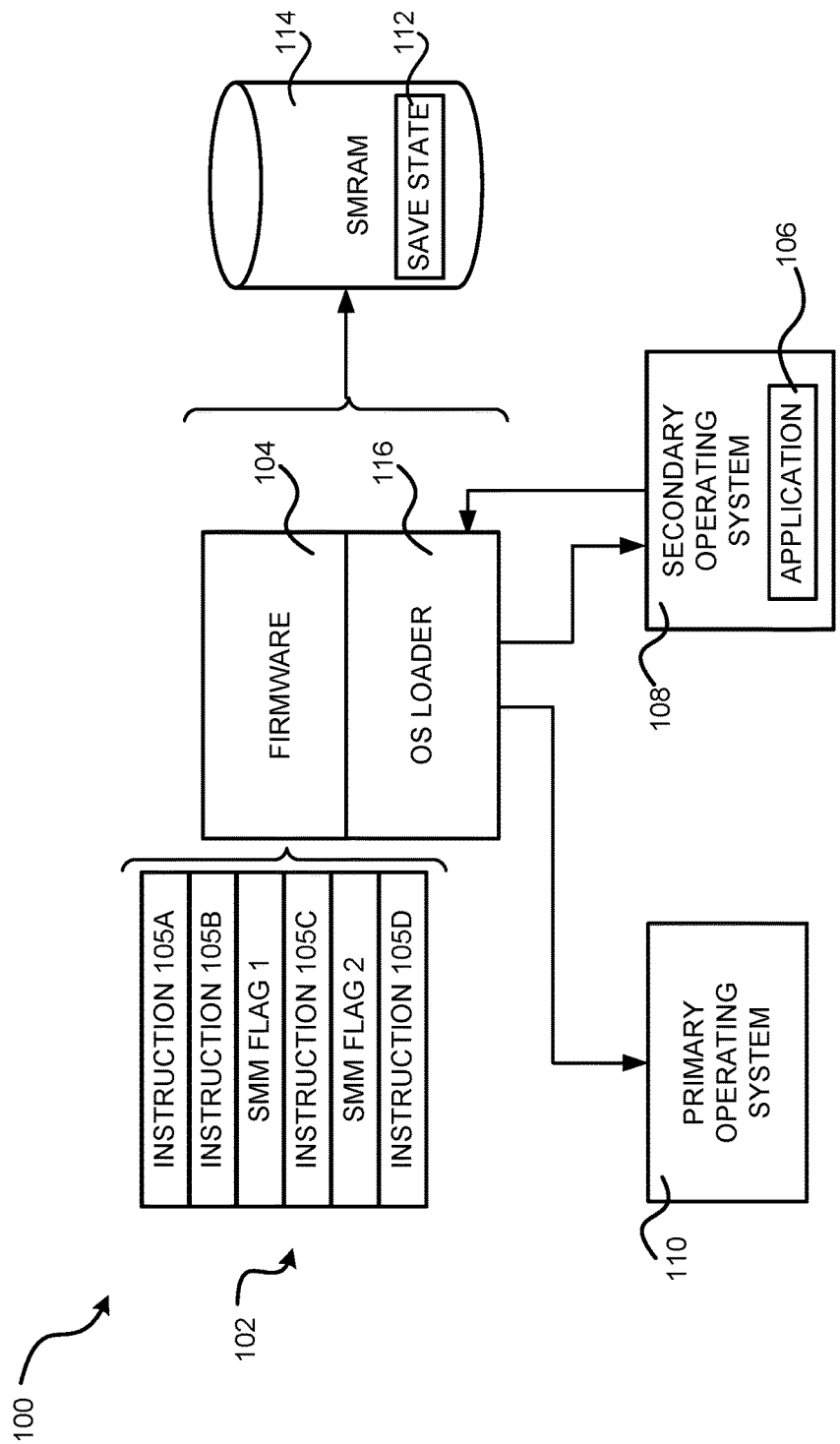
FIG. 1 shows an example computing system configured to continue firmware initialization after execution of a secondary O/S.

Technologies are disclosed to continue firmware initialization after execution of a secondary O/S. In the following detailed description, references are made to the accompanying drawings that form a part hereof, and in which are shown by way of illustration specific configurations or examples. Referring now to the drawings, aspects of the various implementations provided herein and an exemplary operating environment will be described.

While the technical details are presented herein in the general context of program modules that execute in conjunction with the execution of a runtime environment and a computer firmware, those skilled in the art will recognize that the configurations can also be implemented in combination with other program modules. Generally, program modules include routines, programs, components, data structures, and other types of structures that perform particular tasks or implement particular abstract data types.

Moreover, those skilled in the art will appreciate that the configurations described herein can be practiced with other computer system configurations, including hand-held devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

FIG. 1 is an example system 100 that uses an SMM to continue firmware initialization after execution of a secondary O/S in order to boot a primary O/S. In the system 100, a firmware initialization routine 102 is executed to initialize firmware 104. In some examples, the firmware initialization routine 102 is a process performed by firmware or software routines after a computer is powered on. Some functions of the firmware initialization routine 102 include, but are not limited to, a POST process that verifies the integrity of the firmware, finds and initializes system memory, and identifies and organizes devices available for booting.

The firmware initialization routine 102 can include a series of executable instructions, illustrated as instructions 105A-105D in FIG. 1. It is noted that the number of instructions illustrated in FIG. 1 is for purposes of description only, as various firmware initialization processes can have different numbers of instructions and will have many more instructions than illustrated in FIG. 1. The instructions 105A-105D can be configured to perform various types of initialization functions, such as those described above. In some examples, the instructions 105A-105D are performed in sequence. In other words, instruction 105A is performed and completed before instruction 105B. It should be understood, however, that the presently disclosed subject matter is not limited to a sequential execution of the instructions 105A-105D and can be executed in parallel by some processors.

As noted above, it might be desirable, or necessary, to execute an application 106 using a secondary O/S 108 before finalizing the firmware 104 initialization that allows the system 100 to be handed over to the primary O/S 110. In some examples, the primary O/S 110 is the operating system used during normal operation of the system 100. In further examples, the secondary O/S 108 is a temporary operating system used for a specific task, such as for executing the application 106.

In some examples, if the initialization of the firmware 104 is stopped to allow the secondary O/S 108 to load and execute, after the secondary O/S 108 is shutdown, it may be desired to re-commence the initialization of the firmware 104 at or near the routine at which the firmware 104 initialization was stopped. In these examples, to provide for recommencing the firmware 104 initialization at the routine in which the initialization was stopped, the operating state of the system 100 prior to executing the secondary O/S 108 is saved.

In order to save the current operating state of the system prior to executing the secondary O/S 108, an SMI instruction is executed just prior to the booting of the secondary O/S 108. The SMI instruction causes a processor (shown in FIG. 3) of the system 100 to enter the SMM. Just prior to entering the SMM, a current state of a processor (the processor's context) and potentially other types of data is saved in a special portion of RAM, called the system management RAM ("SMRAM") 114.

The SMRAM 114 is mapped to the physical address space of a processor. The processor uses this space to save the context of the processor and to store the SMI handler code, data, and stack. The SMRAM can also be used to store system management information and OEM-specific information. The default SMRAM size can be determined by the chip set utilized. The SMRAM can be located at a base physical address in physical memory called the SMBASE. The SMBASE is typically set to the beginning of SMRAM. When an SMI occurs, the CPU switches to the SMM, saving the CPU context to addresses relative to the SMBASE and begins execution at SMBASE+8000h in some configurations.

Upon entering the SMM, a save handler (not shown in FIG. 1) is invoked to copy a save state 112 generated by the SMI to another location in memory. As discussed above, the save state 112 includes data relating to the processor context at the time of the SMI. In some examples, the save state can also include, but is not limited to, data relating to chipset registers, interrupt controllers, and a return address at which the firmware 104 is to resume execution after the secondary O/S 108 has completed its execution. As will be discussed in greater detail below, the save state 112, upon shutting down the secondary O/S 108, is used to resume initialization of the firmware 104 at a location of the instructions 105A-105D just following the location of the instructions 105A-105D at which the secondary O/S was executed in order to avoid having to commence initialization of the firmware 104 at the beginning, potentially saving time and reducing computing resources.

Once the save state 112 has been stored, the processor exits the SMM and shifts control from the firmware initialization routine 102 to an operating system loader 116. The operating system loader 116 includes program code to boot an operating system, such as the secondary O/S 108. In some examples, the secondary O/S 108 is an operating environment in which the application 106 is configured to execute. For example, the application 106 can be a facial recognition program configured to execute in a LINUX environment. In this example, the secondary O/S 108 is a LINUX operating system. After the application 106 has completed its execution, the secondary O/S 108 can be shutdown.

Responsive to the secondary O/S 108 being shut down, another SMI is generated to once again enter the firmware initialization routine 102. In this case, a restore handler (not shown in FIG. 1) system 100 is executed that is configured to reload the save state 112 to restore the firmware initialization routine 102 system to the state it was in just prior to the execution of the secondary O/S 108. By restoring the system to the state it was in just prior to loading the secondary O/S 108 will cause the system 100 to appear to the firmware initialization routine 102 as if the secondary O/S 108 and the application 106 were not invoked. Further, restoration of the save state 112 in this manner can, in some examples, prevent the need to start the firmware initialization routine 102 at its beginning.

The firmware initialization routine 102 can include setting or clearing one or more SMM flags. In the example illustrated in FIG. 1, a second SMM flag, SMM flag 2, is part of the firmware initialization routine 102 and can be a signal for the CPU to enter the SMM. The instructions 105A-105D can continue to complete the firmware initialization routine 102. Once completed, the operating system loader 116 is invoked to boot the primary O/S 110.

Figure 2:
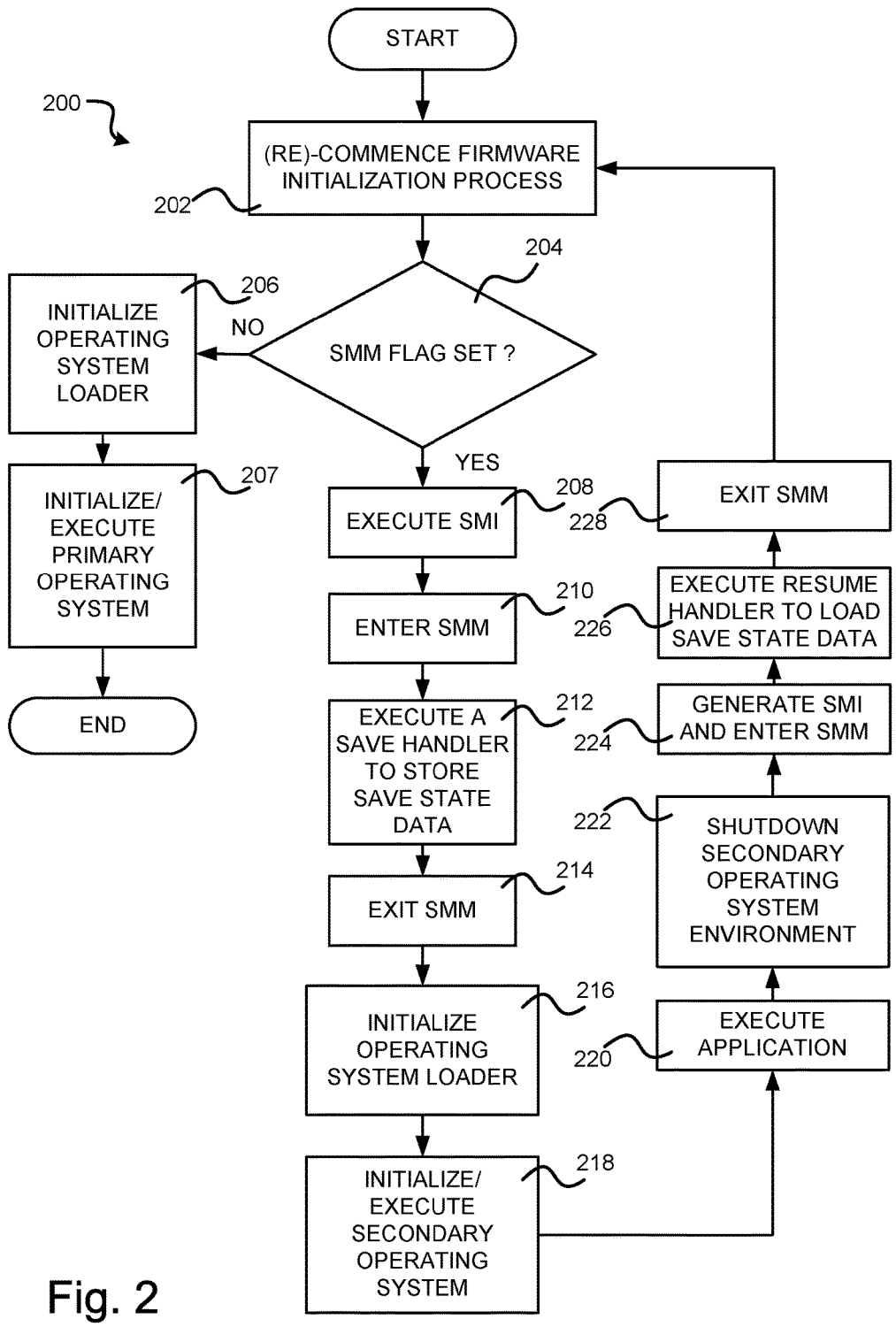
FIG. 2 is a flow diagram showing one illustrative process performed by a computer to continue firmware initialization after execution of a secondary O/S.

FIG. 2 is a flow diagram showing one illustrative routine 200 performed by the system 100 to continue a primary O/S firmware initialization after an interruption to initialize and execute a secondary O/S. The logical operations of the various implementations presented herein are implemented (1) as a sequence of computer implemented acts or program modules running on a computing system and/or (2) as interconnected machine logic circuits or circuit modules within the computing system. The implementation is a matter of choice dependent on the performance requirements of the computing system on which the configurations described herein are implemented. Accordingly, the logical operations making up the implementations described herein are referred to variously as operations, structural devices, acts or modules. It will be recognized by one skilled in the art that these operations, structural devices, acts and modules can be implemented in software, in firmware, in special purpose digital logic, and any combination thereof without deviating from the spirit and scope of the present disclosed subject matter as recited within the claims attached hereto.

The routine 200 begins at operation 202 where the firmware initialization routine 102 is commenced. The firmware initialization routine 102 can include operations to verify CPU registers, to verify the integrity of the BIOS code, to verify components such as a timer or interrupt controller, find and size system main memory, initialize the BIOS, and identify and organize devices available for booting.

The routine 200 continues to operation 204, where a determination is made as to whether or not an SMM flag is set during the firmware initialization routine 102. If no SMM flag is set during the firmware initialization routine 102, the routine 200 continues to operation 206, where the operating system loader 116 is initialized. The routine 200 continues to operation 207, where the primary O/S 110 is initialized. The routine 200 can thereafter end.

If an SMM flag is set at operation 204, the routine continues to operation 208 where an SMI is executed. The SMI causes the CPU of a system to move from the firmware initialization routine 102 to a SMM.

The routine 200 continues to operation 210, where the CPU of the system enters the SMM. As discussed above, the SMM is a special-purpose operating mode of a CPU. A benefit of the SMM is that the SMM offers a distinct, isolated processor environment that operates transparently to the operating system or executive and software applications. In the context of the routine 200, it might be desirable to initialize and execute (or boot) a secondary O/S and an application 106 in a manner that is transparent to the firmware initialization routine 102.

The routine 200 continues to operation 212, where the save state 112 is stored. As discussed above, the save state 112 can vary, but in some examples, can include the content or current state of chipset registers, interrupt controllers, processor context, and the return address routine 102 execution following the shutdown of the secondary O/S.

The routine 200 continues to operation 214, where the CPU exits the SMM. The routine 200 continues to operation 216, where the operating system loader 116 is initialized to boot to a secondary O/S. In some examples, the operating system loader 116 may include one or more instructions sets to boot the primary O/S 110 as well as one or more secondary O/S 108.

The routine 200 continues to operation 218, where the secondary O/S 108 is booted. As mentioned above, the secondary O/S 108 is an operating environment in which the application 106 is configured to operate. For example, the application 106 can be a facial recognition program configured to execute in a MICROSOFT WINDOWS operating system. In this example, the secondary O/S 108 is one of the WINDOWS family of operating systems from MICROSOFT CORPORATION.

The routine 200 continues to operation 220, where the application 106 is executed. The routine 200 then continues to operation 222, where the secondary O/S 108 is shutdown.

The routine 200 continues to operation 224, where an SMI is generated and the processor enters the SMM. As discussed above, in some examples, it is desirable for the execution of the secondary O/S 108 and the application 106 to be transparent to the processor during firmware initialization. In these examples, the save state 112 of the processor is used to continue execution of the system firmware 104 at a location of the firmware initialization routine 102 following the location of the firmware initialization routine 102 at which the current SMI was generated.

The routine 200 continues to operation 226, where a resume handler is executed to load the save state 112 data. As noted above, in one example, the save state 112 is used to provide for the appearance of the transparency of the invocation of the secondary O/S 108 to the firmware initialization routine 102.

The routine 200 continues to operation 228, where the processor exits the SMM. The routine 200 continues at operation 202, where the execution of firmware initialization routine 102 is continued at a location of the firmware initialization routine 102 following the location at which the SMI was generated for executing the save handler. The routine 200 continues to operation 204. In some examples, the routine 200 will continue until all SMM flags have been acted upon, resulting in a continuation of the routine 200 to operation 206, where the primary operating system can be loaded. The routine 200 thereafter ends.

Figure 3:
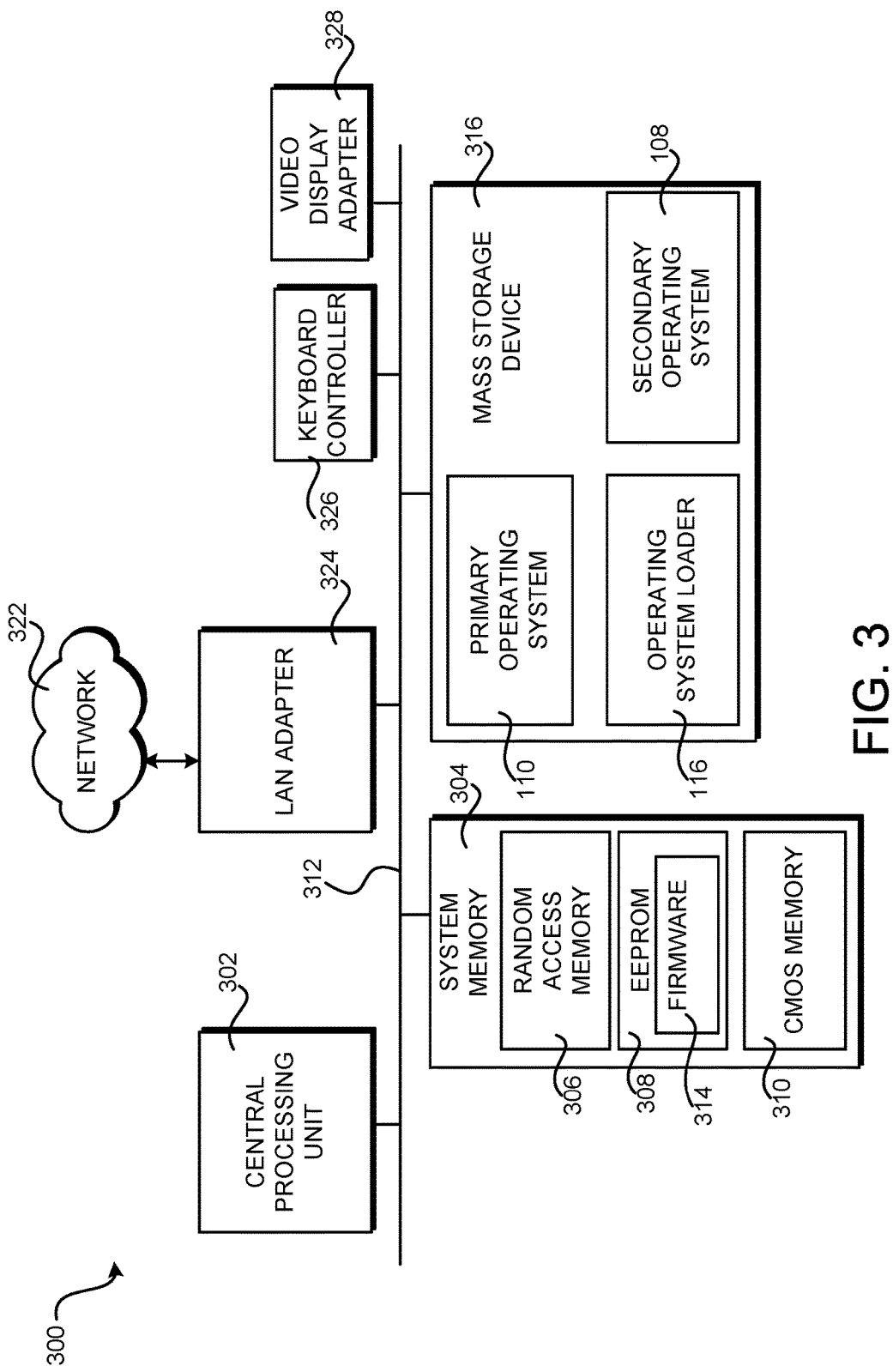
FIG. 3 is a computer architecture diagram that illustrates various components of a computer that provides an illustrative operating environment for the configurations disclosed herein.

FIG. 3 and the following discussion are intended to provide a brief, general description of a suitable computing environment 300 in which the configurations described herein can be implemented. The computer architecture shown in FIG. 3 illustrates a conventional computer, including a CPU 302, a system memory 304, including a RAM 306, an EEPROM 308, a CMOS memory 310, and a system bus 312 that couples the system memory 304 to the CPU 302. The EEPROM 308 can store firmware 314 for use in operating the system environment 300, such as a firmware 104 or an extensible firmware interface ("EFI"), containing the basic routines that help to transfer information between elements within the computer, such as during startup. The CMOS memory 310 is a battery-backed memory device that is used by the firmware 314 to store setting information for the system environment 300. Additional details regarding the architecture and operation of the firmware 314 will be provided below.

The system environment 300 further includes a mass storage device 316 for storing the primary O/S 110, the secondary O/S 108, the operating system loader 116, application programs, and other program modules. The mass storage device 316 is connected to the CPU 302 through a mass storage controller (not shown) connected to the system bus 312. The mass storage device 316 and its associated computer-readable media, provide non-volatile storage for the system environment 300. Although the description of computer-readable media contained herein refers to a mass storage device, such as a hard disk or CD-ROM drive, it should be appreciated by those skilled in the art that computer-readable media can be any available media that can be accessed by the system environment 300.

By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the system environment 300. Computer storage media does not include carrier waves or non-transitory signals.

According to various configurations of the disclosed subject matter, the system environment 300 can operate in a networked environment using logical connections to remote computers through a network 322, such as the Internet. The system environment 300 can connect to the network 322 through a local area network ("LAN") adapter 324 connected to the system bus 312. It should be appreciated that the LAN adapter 324 can also be utilized to connect to other types of networks and remote computer systems. The system environment 300 can also include a keyboard controller 326 for receiving input from a keyboard and a video display adapter 328 for providing output to a display screen.

According to example of the disclosed subject matter, the CPU 302 may comprise a general purpose microprocessor from INTEL CORPORATION. For instance, the CPU 302 may comprise a PENTIUM 4 or XEON microprocessor from INTEL CORPORATION. As known to those skilled in the art, such microprocessors support a system management mode. The SMM provides an alternative operating environment that can be used to monitor and manage various system resources for efficient energy usage, to control system hardware, and/or to run proprietary code. The SMM is also available in the PENTIUM 4, XEON, P6 family, PENTIUM, and INTEL 386 processors. SMM is a special-purpose operating mode for handling system-wide functions like power management, system hardware control, or proprietary OEM-designed code. It is intended only for use by system firmware, not by applications software or general-purpose system software.

Figure 4:
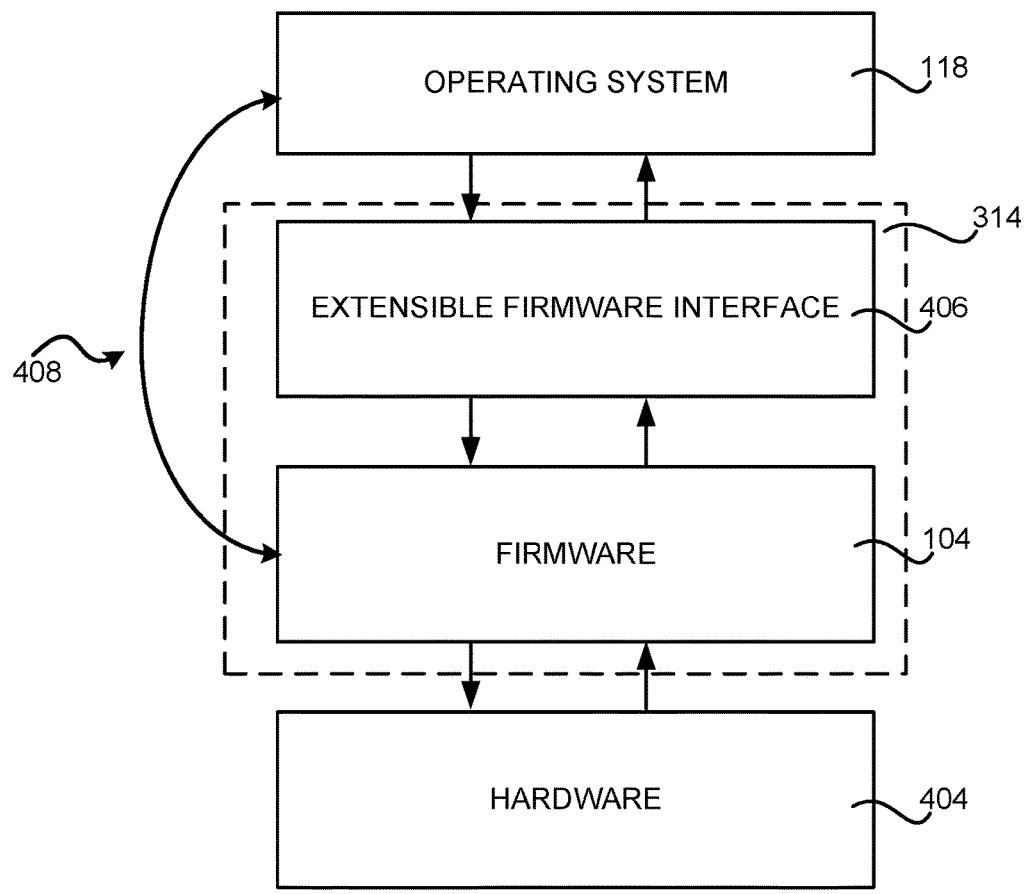
FIGS. 4 and 5 are software architecture diagrams that illustrate aspects of a firmware environment utilized by examples described herein, according to an example.

Referring now to FIG. 4, additional details regarding the operation of the firmware 314 of the system environment 300 will be described. According to examples of the presently disclosed subject matter, the firmware 314 can comprise the firmware 104. As known to those skilled in the art, the firmware 104 of a PC-compatible computer provides an interface between the primary O/S 110 and hardware 404 of the system environment 300. In some examples, the firmware 314 can comprise a firmware 314 compatible with the EFI specification from INTEL CORPORATION that defines the execution of an EFI 406.

The EFI specification describes an interface between the primary O/S 110 and the firmware 314. The EFI specification defines the interface that platform firmware must implement, and the interface that the operating system 110 can use in booting. How the firmware 314 implements the EFI 406 is left up to the manufacturer of the firmware. The intent of the specification is to define a way for the operating system 110 and firmware 314 to communicate only information necessary to support the operating system boot process. This is accomplished through a formal and complete abstract specification of the software-visible interface presented to the operating system by the platform and the firmware.

According to one implementation of the EFI 406 on INTEL CORPORATION IA-32 platforms, both the EFI 406 and a firmware 104 can be presented in the firmware 314. This allows users and system integrators to support both firmware interfaces. In order to provide this functionality, an interface 408 can be provided for use by legacy operating systems and applications. Additional details regarding the architecture and operation of the EFI 406 are provided below. Moreover, additional details regarding the operation and architecture of the EFI 406 can be found in the EFI specification which is available from INTEL CORPORATION and expressly incorporated herein by reference.

Figure 5:
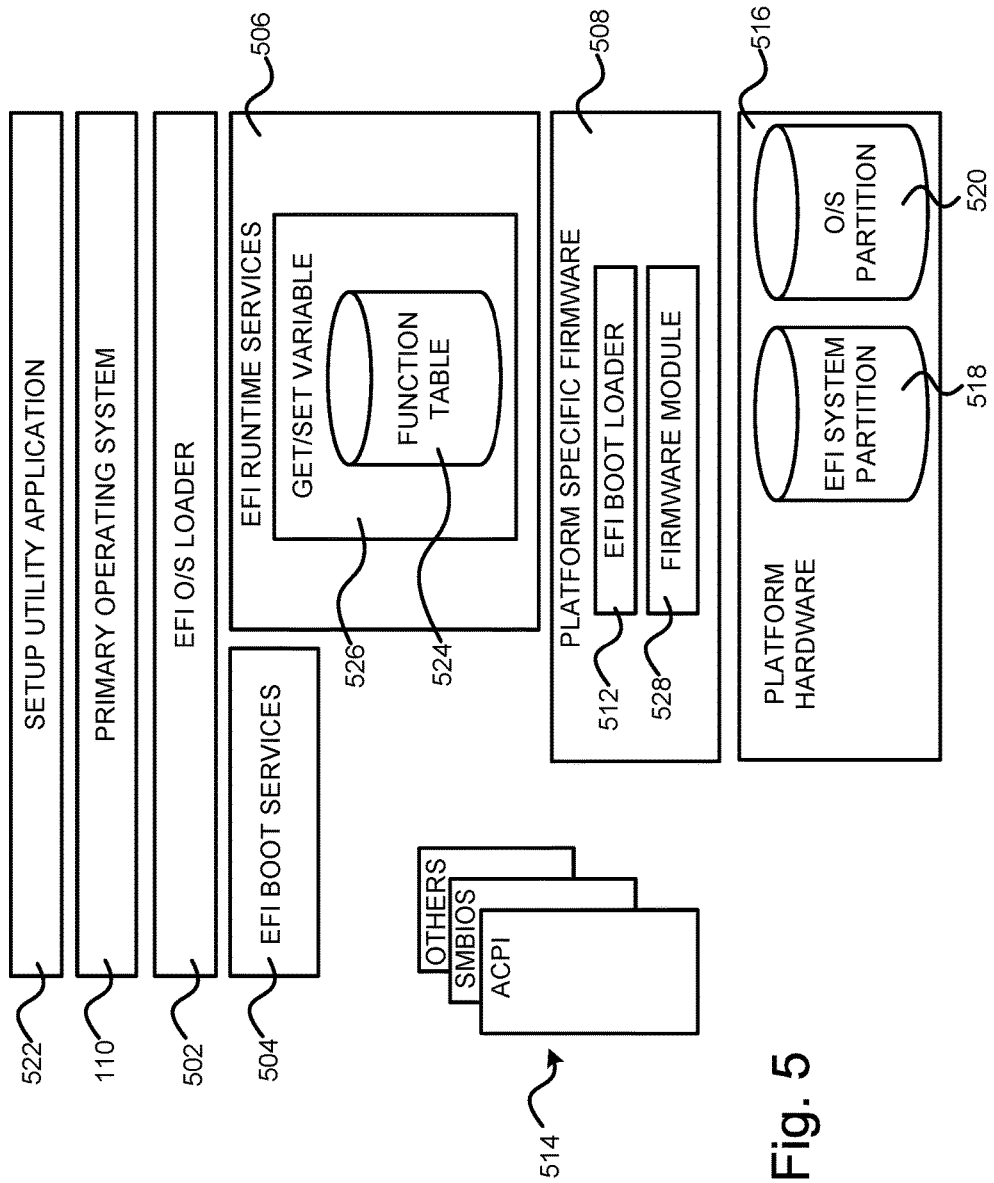

Turning now to FIG. 5, additional details regarding an EFI specification-compliant system utilized to provide an operating environment for the various implementations presented herein will be described. As shown in FIG. 5, the system includes platform hardware 516 and platform specific firmware 508. The platform specific firmware 508 can retrieve an O/S image from the EFI system partition 518 using an EFI O/S loader 502. The EFI system partition 518 can be an architecturally shareable system partition. As such, the EFI system partition 518 defines a partition and file system that are designed to allow safe sharing of mass storage between multiple vendors. An O/S partition 520 can also be utilized.

Once started, the EFI O/S loader 502 continues to boot the complete operating system 110. In doing so, the EFI O/S loader 502 can use EFI boot services 504 to interface to other supported specifications to survey, comprehend, and initialize the various platform components and the operating system software that manages them. Thus, interfaces 514 defined by other specifications can also be present on the system. For example, ACPI and the System Management BIOS ("SMBIOS") specifications can be supported.

As mentioned above, during the boot process, it might be desirable to execute an application using the secondary O/S 108. In those examples, the secondary O/S 108 can be booted rather than the primary O/S 110 utilizing the mechanism described above Based on the foregoing, it should be appreciated that technologies have been described herein for using a save state area of the system management mode to modify an execution path during a boot operation to execute a preboot application. Moreover, although the configurations described herein have been described in language specific to computer structural features, methodological acts and by computer readable media, it is to be understood that the disclosed subject matter defined in the appended claims is not necessarily limited to the specific structures, acts or media described. Therefore, the specific structural features, acts and mediums are disclosed as exemplary configurations implementing the claimed disclosed subject matter.

The various configurations described above are provided by way of illustration only and should not be construed to limit the disclosed subject matter. Those skilled in the art will readily recognize various modifications and changes that can be made to the presently disclosed subject matter without following the example configurations and applications illustrated and described herein, and without departing from the true spirit and scope of the invention, which is set forth in the following claims.

What is claimed is:

1. A computer-implemented method for using a system management mode (SMM) to modify an execution path during a boot operation to execute an application, the method comprising:
   during execution of a firmware, determining whether a secondary operating system is to be executed prior to the execution of a primary operating system;
   generating a first system management interrupt (SMI);
   entering the SMM;
   executing a save handler in the SMM to store a save state;
   exiting the SMM;
   causing a secondary operating system to be executed, wherein the application is executed using the secondary operating system;
   responsive to the shutting down of the secondary operating system, generating a second SMI;
   entering the SMM;
   executing a restore handler in the SMM for loading the save state;
   exiting the SMM; and
   continuing execution of the firmware at a location following a location at which the first SMI was generated.

2. The computer-implemented method of claim 1, wherein generating the first SMI comprises determining if an SMM flag is set.

3. The computer-implemented method of claim 1, wherein the save state is stored in system management RAM.

4. The computer-implemented method of claim 1, wherein the save state comprises a processor context.

5. The computer-implemented method of claim 4, wherein the save state further comprises data relating to chipset registers, memory content, or interrupt controllers.

6. The computer-implemented method of claim 5, wherein save state comprises a return address specifying a location at which execution of the firmware is to continue following the shutdown of the secondary operating system.

7. The computer-implemented method of claim 1, wherein the application comprises an anti-virus application, a biometric or facial recognition application, a diagnostic utility, a memory partitioning utility, a recovery service, or a backup/restore service.

8. A non-transitory computer-readable storage medium having stored thereon computer-executable instructions which, when executed by one or more processors, cause a computer to:
   during execution of a computer system firmware, determine whether a secondary operating system is to be executed prior to the execution of a primary operating system;
   responsive to determining that the secondary operating system is to be executed, generate a first SMI to cause the one or more processors to enter an SMM;
   execute a save handler to store a save state while in the SMM;
   exit the SMM;
   boot the secondary operating system;
   execute an application in the secondary operating system;
   responsive to the shutting down of the secondary operating system, generate a second SMI to cause the one or more processors to enter the SMM;
   execute a resume handler to load the save state; and
   upon exiting the SMM, continue execution of the computer system firmware at a location following a location of a firmware initialization routine at which the first SMI was generated.

9. The non-transitory computer-readable storage medium of claim 8, wherein the computer-executable instruction to determine whether the secondary operating system is to be executed prior to the execution of the primary operating system comprises computer-execute instructions to determine if an SMM flag is set during the firmware initialization routine.

10. The non-transitory computer-readable storage medium of claim 8, wherein herein the save state is stored in system management RAM.

11. The non-transitory computer-readable storage medium of claim 8, wherein the save state comprises a processor context.

12. The non-transitory computer-readable storage medium of claim 11, wherein the save state further comprises data relating to chipset registers, or interrupt controllers.

13. The non-transitory computer-readable storage medium of claim 12, wherein the save state further comprises the location at which the computer system firmware is to resume execution following the shutdown of the secondary operating system.

14. The non-transitory computer-readable storage medium of claim 8, wherein the application comprises an anti-virus application, a biometric or facial recognition application, a diagnostic utility, a memory partitioning utility, a recovery service, or a backup/restore service.

15. An apparatus comprising:
   a central processing unit (CPU) configured to provide a system management mode (SMM); and a memory device in communication with the CPU, the memory device having computer-executable instructions stored therein, which when executed by the CPU;

during execution of a computer system firmware, determine whether a secondary operating system is to be executed prior to the execution of a primary operating system;

responsive to determining that the secondary operating system is to be executed, generate a first SMI to cause the one or more processors to enter an SMM;

execute a save handler to store a save state while in the SMM;

exit the SMM;

boot the secondary operating system;

execute an application in the secondary operating system;

responsive to the shutting down of the secondary operating system, generate a second SMI to cause the one or more processors to enter the SMM;

execute a resume handler to load the save state; and upon exiting the SMM, continue execution of the computer system firmware at a location following a location of a firmware initialization routine at which the first SMI was generated.

16. The apparatus of claim 15, wherein the computer-executable instruction to determine whether the secondary operating system is to be executed prior to the execution of the primary operating system comprises computer-execute instructions to determine if an SMM flag is set during the firmware initialization routine.

17. The apparatus of claim 15, wherein the save state is stored in system management RAM.

18. The apparatus of claim 17, wherein the save state comprises data relating to a processor context.

19. The apparatus of claim 18, wherein the save state further comprises data relating to at least one of chipset registers, interrupt controllers, or information relating to the execution of the firmware initialization routine.

20. The apparatus of claim 19, wherein the preboot application comprises at least one of an anti-virus application, a biometric or facial recognition application, a diagnostic utility, a memory partitioning utility, a recovery service, or a backup/restore service.

* * * * *

UNITED STATES PATENT AND TRADEMARK OFFICE
CERTIFICATE OF CORRECTION

PATENT NO. : 10,055,234 B1
APPLICATION NO. : 15/176895
DATED : August 21, 2018
INVENTOR(S) : Srinivasan Narayana Rao Page 1 of 1

It is certified that error appears in the above-identified patent and that said Letters Patent is hereby corrected as shown below:

In the Claims

Column 10 (Claim 10) Lines 45-47 delete:
"10. The non-transitory computer-readable storage medium of claim 8, wherein herein the save state is stored in system management RAM."

And insert:
--10. The non-transitory computer-readable storage medium of claim 8, wherein the save state is stored in system management RAM.--

Signed and Sealed this
Twenty-fifth Day of September, 2018

Andrei Iancu
*Director of the United States Patent and Trademark Office*